US006092461A

United States Patent [19]

Tanaka et al.

[11] Patent Number: 6,092,461

[45] Date of Patent: Jul. 25, 2000

[54] HEAT-SENSITIVE STENCIL, PROCESS OF FABRICATING SAME AND METHOD OF PRODUCING PRINTING MASTER USING SAME

[75] Inventors: Tetsuo Tanaka; Hiroshi Tateishi; Fumiaki Arai; Masanori Rimoto; Hiroshi Adachi; Kohichi Ohshima, all of Shizuoka-ken, Japan

[73] Assignees: Ricoh Company, Ltd., Tokyo; Tohoku Ricoh Co., Ltd., Miyagi-ken, both of Japan

[21] Appl. No.: 09/469,537

[22] Filed: Dec. 22, 1999

Related U.S. Application Data

[62] Division of application No. 09/111,436, Jul. 8, 1998.

[30] Foreign Application Priority Data

Jul. 10, 1997 [JP] Japan .................................... 9-200897
Jun. 26, 1998 [JP] Japan .................................. 10-196799

[51] Int. Cl.$^{7}$ ................................ B41C 1/14; B32B 5/18

[52] U.S. Cl. .................... 101/128.21; 427/273; 427/335; 427/336

[58] Field of Search ............................ 101/128.21, 128.4; 428/195; 503/200; 427/273, 335, 336, 337

[56] References Cited

U.S. PATENT DOCUMENTS 5,447,899 9/1995 Matoba et al. .......................... 503/200
5,843,560 12/1998 Ohta et al. .......................... 101/128.21
5,924,360 7/1999 Adachi et al. ...................... 101/128.21

FOREIGN PATENT DOCUMENTS

747238A1 12/1996 European Pat. Off. .
770500A2 5/1997 European Pat. Off. .
5212983 8/1993 Japan .
5254269 10/1993 Japan .
8-67081 3/1996 Japan .
1333103 10/1973 United Kingdom .
1404696 9/1975 United Kingdom .
2176621 12/1986 United Kingdom .
2298494 9/1996 United Kingdom .
2306689 5/1997 United Kingdom .

*Primary Examiner*—Stephen R. Funk
*Attorney, Agent, or Firm*—Cooper & Dunham LLP

[57] ABSTRACT

A heat-sensitive stencil including a porous support, and a thermoplastic resin film laminated on the support and having a surface smoothness of at least 10,000 seconds. The stencil is fabricated by bonding a thermoplastic resin film to a porous support with an adhesive having a specific viscosity and a specific volatile matter content, while maintaining each of the support and the film under a specific tension. The stencil may also be fabricated by applying a coating composition containing a resin and first and second solvents having a specific solubility and specific evaporation rates, and drying the applied composition to form a porous support. A printing master is produced by heating the above stencil imagewise by a thermal head with a heating energy of not greater than 0.05 mJ/dot.

2 Claims, 1 Drawing Sheet

HEAT-SENSITIVE STENCIL, PROCESS OF FABRICATING SAME AND METHOD OF PRODUCING PRINTING MASTER USING SAME

This is a divisional of application Ser. No. 09/111,436 filed Jul. 8, 1998.

BACKGROUND OF THE INVENTION

This invention relates to a heat-sensitive stencil, to a process of fabricating same and a method of producing a printing master using same.

One known heat-sensitive stencil is composed of an ink-permeable thin paper serving as an ink support and a thermoplastic resin film bonded with an adhesive to the support. The stencil is heated imagewise by, for example, a thermal head to perforate the heated portions of the thermoplastic resin film, thereby obtaining a printing master for reproducing images by mimeographic printing. An overcoat layer is generally provided over a surface of the thermoplastic resin film to prevent the sticking of the film with the thermal head.

The known heat-sensitive stencil has a problem, because the heated portions are not completely perforated. The portion of the stencil which remains unperforated results in a white spot in reproduced images obtained therefrom. This problem can be overcome by increasing thermal energy for the perforation. However, an increase of the thermal energy causes an increase of the master producing time as well as a shortened service life of the heating means.

A method has been proposed to increase the heat sensitivity of the stencil by reducing the thickness of the thermoplastic resin film, by using a low softening resin as the film or by using a resin having a great thermal shrinkage as the film. This method, however, requires an increased cost and, further, causes deterioration of physical properties of the stencil.

An attempt has also been made to increase the smoothness of the surface of the film with a view toward reducing perforation failure. JP-A-H5-212983 discloses a method of producing a smooth surface stencil by controlling a tension between a thermoplastic resin film and a support during lamination thereof. JP-A-H8-67081 discloses a method of producing a smooth surface stencil by heat-bonding a thermoplastic resin film and a support without using an adhesive. These methods give a smoothness of at most 5,000 seconds, even when the film originally has a surface smoothness of more than 10,000 seconds.

SUMMARY OF THE INVENTION

It has now been found that a surface smoothness of a stencil of 5,000 seconds is insufficient to prevent perforation failure, especially when the stencil is perforated by a thermal head with a small heat energy of not greater than 0.05 mJ/dot. The formation of printing masters with such a small energy is strongly desired in the field. It has also been found that a surface smoothness of at least 10,000 seconds, preferably 15,000 seconds, is required to obtain satisfactory perforation with a thermal energy of a thermal head of not greater than 0.05 mJ/dot.

It is an object of the present invention to provide a heat-sensitive stencil which can be thermally perforated uniformly with a thermal head using a small heat energy.

Another object of the present invention is to provide an economical process for the fabrication of a heat-sensitive stencil of the above-mentioned type.

It is a further object of the present invention to provide a method of forming a high quality printing master even using a small heat energy.

In accomplishing the foregoing objects, there is provided in accordance with one aspect of the present invention a heat-sensitive stencil comprising a porous support, and a thermoplastic resin film laminated on said support and having a surface smoothness of at least 10,000 seconds.

In another aspect, the present invention provides a process of fabricating a heat-sensitive stencil, comprising bonding a thermoplastic resin film having opposing first and second surfaces, said second surface having a surface smoothness of at least 10,000 seconds, to a porous support with an adhesive having a viscosity of at least 1,000 mPa·s and containing a non-volatile matter such that said first surface faces on said support, said bonding being performed while maintaining each of said support and said film under a tension of at least 1 kgf/m in the same direction and while maintaining a ratio of the tension of said support in said direction to the tension of said film in said direction in the range of 1–4, said adhesive being used in such an amount that said non-volatile matter is present between said film and said support in an amount of 0.05–1.0 g of per $m^2$ of said film, so that said second surface of said film laminated on said support has a surface smoothness of at least 10,000 seconds.

In a further aspect, the present invention provides a process of fabricating a heat-sensitive stencil, comprising the steps of:

applying a coating composition to one of the both surfaces of a thermoplastic resin film, said composition containing a resin, a first solvent capable of dissolving said resin, and a second solvent substantially incapable of dissolving said resin and having an evaporation rate lower than that of said first solvent, said film having the other surface with a smoothness of at least 10,000 seconds; and drying said applied composition to form a porous support on said one surface of said film.

The present invention also provides a process of fabricating a heat-sensitive stencil, comprising the steps of:

applying a solution of a resin in a first solvent to one of the both surfaces of a thermoplastic resin film to form a wet resin coating over said one surface, said film having the other surface with a smoothness of at least 10,000 seconds;

spraying vapors or fine droplets of a second solvent substantially incapable of dissolving said resin over said wet resin coating so that said second solvent is taken into said wet resin coating to cause a portion of said resin to precipitate; and then drying said resin coating to form a porous support on said one surface of said film.

The present invention further provides a method of producing a printing master, comprising heating a heat-sensitive stencil imagewise by a thermal head with heating energy of not greater than 0.05 mJ/dot, said stencil comprising a porous support, and a thermoplastic resin film laminated on said support and having a surface smoothness of at least 10,000 seconds.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
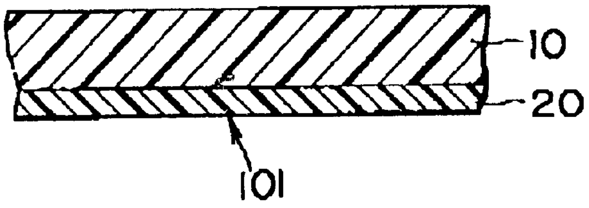
FIGS. 1–4 are sectional views schematically illustrating various embodiments of heat-sensitive stencils according to the present invention.
Figure 2:
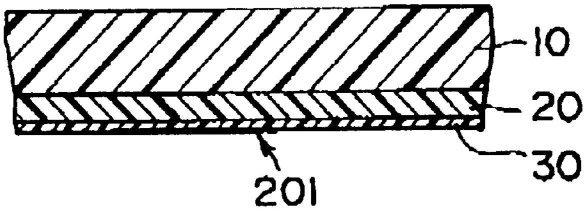
Figure 3:
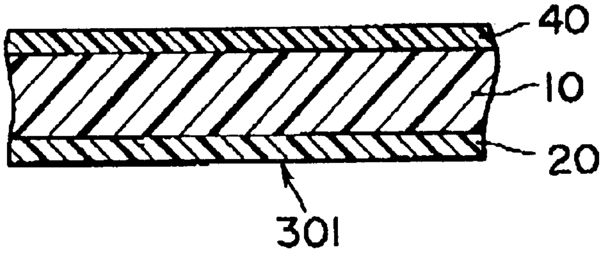
Figure 4:
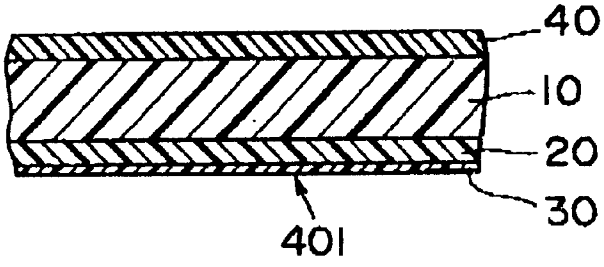

Referring FIGS. 1–4, designated generally as 101, 201, 301 and 401 are heat-sensitive stencils according to the present invention. The reference numeral 10 designates a porous support, 20 a thermoplastic resin film, 30 an overcoat layer and 40 a backcoat layer. The overcoat layer 30 and the backcoat layer 40 are optionally provided as desired.

The thermoplastic resin film 20 may be made of any conventionally employed resin such as a polyester resin. The thickness of the film 20 is suitably determined with the consideration of easiness in handling during preparation of the stencil and desirable heat sensitivity during the perforation with a thermal head and is generally 0.5–10 μm, preferably 1.0–5.0 μm. It is important that the thermoplastic resin film 20 should have a surface smoothness of at least 10,000 seconds, preferably at least 15,000 seconds in order to achieve the objects of the present invention.

The term "smoothness" herein is as measured in accordance with Oken Smoothness Test Method described in JAPAN TAPPI No. 5-B. An Oken-type smoothness measuring device (KY-55 manufactured by Kumagaya Riki Kogyo K. K.) is suitably used for this method. Before measurement of smoothness, samples are allowed to stand for 24 hours in an atmosphere maintained at a temperature of 20° C. and a relative humidity of 65%. Measurement is made on arbitrary three areas of a sample and an average of the three measured values represents the smoothness of the film.

The overcoat layer 30 is provided over the thermoplastic resin film 20 and is brought into sliding contact with a thermal head in producing a printing master from the stencil 201 or 401. The overcoat layer 30 functions to prevent the sticking between the thermal head and the stencil, so that the thermal head can smoothly run or slide on the stencil. The overcoat layer 30 can also serve to function as an antistatic layer. It is important that the overcoat layer 30 should have a surface smoothness of at least 10,000 seconds, preferably at least 15,000 seconds in order to achieve the objects of the present invention. The overcoat layer 30 may be a resin layer optionally containing one or more additives such as a metal salt of a fatty acid, a phosphate surfactant, a lubricant such as a silicone oil, or a fluorocarbon containing a perfluoroalkyl group, a lubricant and an antistatic agent. Alternatively, the overcoat layer 30 may be an oil layer or a layer of an inorganic or organic fine powder of, for example, a lubricant, an antistatic agent or a releasing agent. Since the overcoat layer 30 is formed on the thermoplastic resin film 20, the surface smoothness of the overcoat layer 30 generally depends upon that of the film 20.

The backcoat layer 40 is provided on the porous support 10 to improve the rigidity of the stencil, running or sliding property of the stencil on a master forming device and a printing device and to prevent the curling, static charging and blocking of the stencil. The backcoat layer 40 is desirably more porous than the porous support 10.

The porous support 10 may be a thin paper having a thickness of generally 5–70 μm, preferably 10–55 μm, and a basis weight of generally 5–15 g/m$^2$ and formed of natural and/or synthetic fibers. The natural fibers may be, for example, those of wood, cotton, kozo (Broussonetia kazinoki), mitsumata (Edgeworthia papyrifera), ganpi (Wikstroemia sikokiana Fr, et Sav.), a flax plant, Manila hemp, straw and bagasse. The synthetic fibers may be, for example, polyester fibers, vinylon fibers, acrylic fibers, polyethylene fibers, polypropylene fibers, polyamide fibers and rayon fibers. Alternatively, the porous support 10 may be a porous resin layer.

When the porous support 10 is a thin paper, the stencil is prepared by the following process:

The thermoplastic resin film 20 and the porous support 10 are bonded to each other with an adhesive having a viscosity of at least 1,000 mPa·s and containing a non-volatile matter. The film 20 has opposing first and second surfaces wherein at least the second surface has a surface smoothness of at least 10,000 seconds. The bonding is carried out such that the first surface of the film 20 faces on the support 10. During the bonding, each of the support 10 and the film 20 is subjected to a tension of at least 1 kgf/m in the same direction, while maintaining a ratio of the tension of the support 10 in that direction to the tension of the film 20 in that direction in the range of 1:1 to 4:1. The adhesive is used in such an amount that the non-volatile matter is present between the film 20 and the support 10 in an amount of 0.05–1.0 g of per m$^2$ of the film 20 (namely per m$^2$ of the bonding area). By bonding the film 20 and the support 10 in the above condition, the second surface of the film 20 laminated on the support 10 has a surface smoothness at least 10,000 seconds.

When the tension ratio is smaller than 1:1, the laminate is apt to curl. Too high a tension ratio in excess of 4:1 causes shrinkage of the film 20 so that the smoothness is significantly lowered. It is also important that a tension of at least 1 kgf/m should be applied to the film 20 in order to maintain the surface smoothness thereof.

The adhesive is a solvent solution of a resin such as an acrylic resin, a vinyl resin, an ethylene resin, an amide resin, an urethane resin or a cellulose resin. The viscosity of the adhesive should be at least 1,000 mPa·s at the time the film 20 has just been brought into contact with the support 10 through the adhesive. The viscosity can be determined by previous experiments. It is preferred that the adhesive be applied to the film 20 rather than to the support 10 for reasons of obtaining a better smoothness of the film. The amount of the adhesive (solid matter) also has been found to have an influence upon the smoothness and should fall within the above-described range.

When the porous support 10 is a porous resin layer, the stencil may be prepared by the following two processes.

In one process, a resin for forming the porous resin layer is first dissolved, completely or partly, in a mixed solvent including a first solvent (good solvent) capable of dissolving the resin and a second solvent (poor solvent) substantially incapable of dissolving the resin and having a lower evaporation rate than the first solvent, thereby to obtain a coating liquid in the form of a solution or a dispersion. Preferably the second solvent has a boiling point which is higher by 10–40° C. than that of the first solvent and which is preferably 150° C. or less.

The concentration of the resin in the mixed solvent solution is generally 2–50% by weight, preferably 5–30% by weight. The weight ratio of the first solvent to the second solvent, which has an influence upon the pore structure of the porous resin layer, is generally 40:60 to 95:5.

The thus obtained coating liquid is then applied over a surface of a thermoplastic resin film to form a wet resin coating. The application of the coating liquid may be carried out by any desired coating method such as blade coating, transfer roll coating, wire bar coating, reverse roll coating or gravure coating. In this case, it is preferred that the coating liquid immediately before being applied be heated at a temperature higher than that of the atmosphere at which the coating step is performed and which is generally room temperature. Thus, when the coating is performed with a die coater, the die from which the solution is applied to the thermoplastic resin film may be surrounded by a heating jacket to which a heating medium is fed. It is also preferred that coating liquid immediately after being applied to the thermoplastic resin film be cooled before the next drying step to a temperature lower by 2–30° C., preferably 5–20° C., than that of the coating liquid immediately before being applied.

The wet resin coating is then heated at a temperature below the boiling point of the second solvent but sufficient to vaporize part of the first solvent so that a portion of the resin precipitates. Subsequently, the coating is further heated preferably at 80° C. or less until the coating is completely dried. During the course of the vaporization of the solvents, there are formed a multiplicity of pores.

Examples of suitable poor and good solvents are shown in Table 1 below. As shown, good and poor solvents vary with the resin to be dissolved.

TABLE 1

| Resin | PVC*1 | VCA*2 | PB*3 | PS*4 | ANS*5 | ABS*6 |
|---|---|---|---|---|---|---|
| Solvent (b.p.°C.) | | | | | | |
| Methanol (64.5) | poor | poor | poor | poor | poor | poor |
| Ethanol(78.3) | poor | poor | poor | — | — | poor |
| Ethyl acetate(77.1) | — | good | poor | good | good | — |
| Acetone(56.1) | good | good | poor | good | good | good |
| Methyl ethyl ketone(79.6) | good | good | poor | good | good | good |
| Diethyl ether(34.5) | poor | — | — | poor | poor | poor |
| Tetra-hydrofuran (65–67) | good | good | good | good | — | — |
| Hexane(66.7) | poor | poor | good | poor | poor | — |
| Heptane(98.4) | poor | poor | poor | poor | poor | poor |
| Benzene(60.1) | — | poor | good | good | good | good |
| Toluene(110.6) | — | good | good | good | good | good |
| Xylene(139.1) | — | good | good | good | good | good |
| Chloroform (61.2) | — | good | good | good | good | good |
| Carbon tetra-chloride(76.7) | — | good | good | good | — | — |
| water(100.0) | poor | poor | poor | poor | poor | poor |

| Resin | MAR*7 | PVA*8 | PC*9 | AC*10 | AR*11 | VB*12 |
|---|---|---|---|---|---|---|
| Solvent (b.p.°C.) | | | | | | |
| Methanol(64.5) | — | good | poor | — | poor | good |
| Ethanol(78.3) | — | poor | poor | — | poor | good |
| Ethyl acetate(77.1) | good | good | poor | good | good | good |
| Acetone(56.1) | good | good | poor | good | good | good |
| Methyl ethyl ketone(79.6) | good | good | poor | good | — | good |
| Diethyl ether(34.5) | — | poor | — | — | — | poor |
| Tetra-hydrofuran (65–67) | good | — | good | good | — | good |
| Hexane(68.7) | poor | poor | poor | poor | poor | poor |
| Heptane(98.4) | poor | poor | poor | poor | poor | poor |
| Benzene(60.1) | good | good | good | — | good | poor |
| Toluene(110.6) | good | good | good | poor | good | poor |
| Xylene(139.1) | good | good | good | poor | good | — |
| Chloroform (61.2) | good | good | good | good | good | — |
| Carbon tetra-chloride(76.7) | — | — | good | poor | — | — |
| Water(100.0) | poor | poor | poor | poor | poor | poor |

*1 PVC: poly(vinyl chloride)
*2 VCA: vinyl chloride-vinyl acetate copolymer
*3 PB: polybutylene
*4 PS: polystyrene
*5 ANS: acrylonitrile-styrene copolymer
*6 ABS: acrylonitrile-butadiene-styrene copolymer
*7 MAR: methacrylic acid resin
*8 PVA: poly(vinyl acetate)
*9 PC: polycarbonate
*10 AC: acetylcellulose resin
*11 AR: acrylate resin
*12 VB: polyvinyl-butyral Any resin may be used for the formation of the porous layer. Illustrative of suitable resins of the porous layer are a vinyl resin such as poly(vinyl acetate), poly(vinyl butyral), poly(vinyl acetal), vinyl chloride-vinyl acetate copolymer, vinyl chloride-vinylidene chloride copolymer or styrene-acrylonitrile copolymer: a polyamide such as nylon; polybutylene; polyphenylene oxide; (meth)acrylic ester; polycarbonate; or a cellulose derivative such as acetylcellulose, acetylbutylcellulose or acetylpropylcellulose. These resins may be used singly or in combination of two or more. It is preferred that the porous resin layer contain a resin capable of softening at a temperature at which the perforation by a thermal head is carried out, generally at a temperature of 150° C. or less, for reasons of facilitating the perforation of the thermoplastic resin film.

The porous resin layer can contain one or more additives such as a filler, an antistatic agent, a stick-preventing agent, a surfactant, an antiseptic agent and an antifoaming agent. Addition of a filler to the porous resin layer is desirable to control the strength, stiffness and the size of pores thereof. Use of a filler in the form of needles or plates is particularly preferred. Illustrative of suitable fillers are needle-like natural mineral fillers such as magnesium silicate, sepiolite, potassium titanate, wollastonite, zonolite and gypsum fiber; needle-like synthetic mineral fillers such as non-oxide-type needle whiskers, oxide whiskers and mixed oxide whiskers; platy fillers such as mica, glass flakes and talc; pigments such as poly(vinyl chloride) particles, poly(vinyl acetate) particles, polymethyl acrylate particles, zinc oxide, titania, calcium carbonate and microcapsules (e.g. Matsumoto Microsphere); and natural or synthetic fibers such as carbon fiber, polyester fiber, glass fiber, vinylon fiber, nylon fiber and acrylic fiber. The filler is generally used in an amount of 0.5–200%, preferably 8–20% based on the weight of the resin of the porous resin layer.

In the second process, a solution of a resin for the porous resin layer in a first solvent is prepared. The solution is applied over a surface of a thermoplastic resin film to form a wet resin coating over the surface. Then, vapors or fine droplets of a second solvent substantially incapable of dissolving the resin are sprayed over the wet resin coating so that the second solvent is taken into the wet resin coating to cause a portion of the resin to precipitate. Thereafter, the resin coating is heated to dryness. The first and second solvents, the resin and optional additives used for the formation of the porous layer in the second method are similar to those described above in connection with the first method. In the second method, the size and number of pores may be controlled by the amount and particle size of the droplets of the second solvent. It is preferred that the thermoplastic resin film be previously applied with a spray of the second solvent before being applied with the solvent solution of the resin, since the contact area between the resulting porous resin layer and the thermoplastic resin film is decreased and, therefore, the stencil can be more easily perforated by a thermal head.

If desired, the above first and second methods may be combined for the fabrication of the stencil according to the present invention.

The heat-sensitive stencil thus formed by the above first or second methods has a porous resin layer serving as an ink support and formed on a thermoplastic resin film. The stencil is adapted show an air permeability in the range of 3.0 $cm^3/cm^2 \cdot sec$ to 200 $cm^3/cm^2 \cdot sec$, preferably 10 $cm^3/cm^2 \cdot sec$ to 80 $cm^3/cm^2 \cdot sec$, in a portion thereof when the thermoplastic resin film of that portion is perforated to form perforations providing an open ratio $S_O/S_P$ of at least 0.2, wherein $S_O$ represents a total area of the perforations and $S_P$ represents the area of the portion.

The air permeability may be measured in the following manner. A square solid pattern (black pattern) with a size of 10×10 cm is read by a printer (PRIPORT VT 3820 manufactured by Ricoh Company, Ltd.) and a sample stencil is perforated with a thermal head in accordance with the read out pattern to form a printing master. The perforation operations are performed for five similar samples so that five printing masters having open ratios $S_O/S_P$ of about 0.2, 0.35, 0.50, 0.65 and 0.80 are obtained. The open ratio of a master may be measured by making a photomicrograph (magnification: 100) thereof. The photomicrograph is then magnification-copied (magnifying ratio: 200) using a copying machine (IMAGIO MF530 manufactured by Ricoh Company, Ltd.). Perforations shown in the copy are marked on an OHP film and then read by a scanner (300 DPI, 256 gradient). This is binarized with an image retouch software Adobe Photoshop 2.5J. The open ratio of the perforations is measured using an image analysis software NIH IMAGE. The perforated portion each of the printing masters is measured for the air permeability thereof by any conventional method. When at least one of the five masters has an air permeability in the range of 1.0 $cm^3/cm^2 \cdot sec$ to 157 $cm^3/cm^2 \cdot sec$, the stencil is regarded as falling within the scope of the present invention.

The porous resin layer preferably has an average pore diameter of 2–50 μm, more preferably 5–30 μm, for reasons of proper ink permeability. The porous resin layer preferably has a thickness of 5–100 μm, more preferably 6–50 μm, for reasons of proper stiffness of the stencil and proper ink transference. The density of the porous resin layer is preferably 0.01–1 $g/cm^3$, more preferably 0.1–0.7 $g/cm^3$, for reasons of proper stiffness and mechanical strengths. If desired, an adhesive layer may be interposed between the porous resin layer and the thermoplastic resin film.

The following examples will further illustrate the present invention. Parts and percentages are by weight.

EXAMPLE 1

An urethane resin adhesive containing substantially no volatile matters was applied to one surface of a porous sheet support, made of a polyester fiber (0.2 denier: 10%, 0.5 denier; 40%, 1.2 denier: 50%) and having a base weight of 10 $g/m^2$, in an amount of 0.5 g per $m^2$ of the surface. The adhesive when applied to the porous support had a temperature of 90° C. and a viscosity of 1,300 mPa·s (measured by B-type visconeter). After the temperature of the adhesive applied to the surface of the support had been lowered to about 50° C., a biaxially oriented polyester film having a thickness of about 1.5 μm and a surface smoothness of more than 30,000 seconds was applied thereon, while maintaining the film and the support under tensions of 2 kgf/m and 5 kgf/m, respectively, in the same direction. The assembly was then allowed to be cooled to room temperature while maintaining the tensions applied to the film and the support unchanged. A liquid containing a silicone resin and a cationic antistatic agent was applied on the back side of the polyester film opposite the support and dried to form a stick preventing layer (overcoat layer), thereby obtaining a heat-sensitive stencil according to the present invention having a structure shown in FIG. 2.

COMPARATIVE EXAMPLE 1

Example 1 was repeated in the same manner as described except that the amount of adhesive was increased to 1.5 $g/m^2$.

COMPARATIVE EXAMPLE 2

Example 1 was repeated in the same manner as described except that the adhesive when applied to the porous support had a temperature of 120° C. and a viscosity of 600 mPa·s.

COMPARATIVE EXAMPLE 3

Example 1 was repeated in the same manner as described except that the tension applied to the support was increased to 10 kgf/m.

EXAMPLE 2

| | |
|---|---|
| Poly(vinyl butyral) | 4 parts |
| Methanol | 33.6 parts |
| Water | 2.8 parts |

The above composition was stirred to dissolve the resin in the mixed solvent and allowed to quiescently stand to remove foams. The solution was then uniformly applied to a biaxially stretched polyester film (thickness: 1.5 μm, surface smoothness: more than 30,000 seconds) with a wire bar at a temperature of 20° C. and a relative humidity of 60%, thereby to form a wet coating having a deposition amount of 7.0 $g/cm^2$ (on dry basis). This was allowed to stand as such for 15 seconds and then placed in a drying chamber at 50° C. for 1 minute to dry the coating and to a porous layer. A liquid containing a silicone resin and a cationic antistatic agent was applied on the back side of the polyester film opposite the porous layer and dried to form a stick preventing layer (overcoat layer), thereby obtaining a heat-sensitive stencil according to the present invention having a structure shown in FIG. 2.

EXAMPLE 3

| | |
|---|---|
| Cellulose acetate butylate (softening point: 131° C.) | 5 parts |
| Methyl ethyl ketone | 85 parts |

The above composition was stirred to dissolve the resin in the solvent and allowed to quiescently stand to remove foams. The solution was then uniformly applied to a biaxially stretched polyester film (thickness: 1.5 μm, surface smoothness: more than 30,000 seconds) with a wire bar at a temperature of 30° C. and a relative humidity of 90%, thereby to form a wet coating having a deposition amount of 7.0 g/cm$^2$ (on dry basis). Fine droplets of water were sprayed for 15 seconds from Humidiffer UV-107D (manufactured by Hitachi Inc.) over the surface of the wet coating placed at a distance 10 cm away from the Humidiffer. This was allowed to stand as such for 1 minute and then placed in a drying chamber at 50° C. for 2 minutes to dry the coating. The dried coating was a porous layer. A liquid containing a silicone resin and a cationic antistatic agent was applied on the back side of the polyester film opposite the porous layer and dried to form a stick preventing layer (overcoat layer), thereby obtaining a heat-sensitive stencil according to the present invention having a structure shown in FIG. 2.

Each of the thus obtained heat-sensitive stencils was measured for surface smoothness, open ratio, air permeability, perforation efficiency and printed image quality. The surface smoothness, open ratio and air permeability were measured by the methods described previously. The perforation efficiency was measured by perforating a sample with a thermal head of 600 dots/in at an energy of 0.03 mJ/dot using PRIPORT VT 3820 (manufactured by Ricoh Company Ltd.) to form 10×10 dots. The perforated sample was observed with a microscope (magnification: 110) and the dots actually perforated were counted. The perforation efficiency is expressed as a percentage of the number of the perforated dots based on 10×10 dots. Image quality was evaluated with naked eyes for prints (solid pattern image) obtained using sample stencil with respect to white spots and blurs. Evaluation was made by comparison with the image obtained using a commercial stencil (VT2 Master manufactured by Ricoh Company Ltd.) and rated as follows: 5: much better, 4: slightly better, 3: comparable, 2: slightly inferior, 1: much inferior. The results are shown in Table 1.

TABLE 1

| Example | Smoothness (sec) | Open ratio (%) | Air Permeability (cm$^3$/cm$^2$ · sec) | Perforation Efficiency (%) | Image quality |
|---|---|---|---|---|---|
| Example 1 | 12,000 | 20 | 9 | 100 | 5 |
| | | 35 | 14 | | |
| | | 48 | 19 | | |
| | | 63 | 25 | | |
| | | 79 | 30 | | |
| Comparative Example 1 | 4,700 | 20 | 9 | 92 | 2 |
| | | 35 | 13 | | |
| | | 48 | 17 | | |
| | | 63 | 20 | | |
| | | 79 | 28 | | |
| Comparative Example 2 | 6,400 | 20 | 8 | 95 | 3 |
| | | 35 | 12 | | |
| | | 48 | 16 | | |
| | | 63 | 21 | | |
| | | 79 | 29 | | |
| Comparative Example 3 | 2,900 | 20 | 5 | 89 | 1 |
| | | 35 | 11 | | |
| | | 48 | 14 | | |
| | | 63 | 19 | | |
| | | 79 | 27 | | |
| Example 2 | 22,000 | 20 | 4 | 100 | 5 |
| | | 35 | 9 | | |
| | | 48 | 12 | | |
| | | 63 | 16 | | |
| | | 79 | 24 | | |
| Example 3 | 21,000 | 20 | 4 | 100 | 5 |
| | | 35 | 9 | | |
| | | 48 | 13 | | |
| | | 63 | 16 | | |
| | | 79 | 25 | | |

TABLE 1-continued

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H9-200897, filed Jul. 10, 1997 and entitled "Heat-Sensitive Stencil Master, Process of Preparing Same and Method of Preparing Printing Master", inclusive of the specification, claims and drawings, are hereby incorporated by reference herein.

What is claimed is:

1. A process of fabricating a heat-sensitive stencil, comprising the steps of:

applying a coating composition to one of two surfaces of a thermoplastic resin film, said composition containing a resin, a first solvent capable of dissolving said resin, and a second solvent substantially incapable of dissolving said resin and having an evaporation rate lower than that of said first solvent, said film having the other surface with a smoothness of at least 10,000 seconds; and drying said applied composition to form a porous support on said one surface of said film, so that said other surface of said film laminated on said support has the surface smoothness of at least 10,000 seconds.

2. A process of fabricating a heat-sensitive stencil, comprising the steps of:

applying a solution of a resin in a first solvent to one of two surfaces of a thermoplastic resin film to form a wet resin coating over said one surface, said film having the other surface with a smoothness of at least 10,000 seconds;

spraying vapors or fine droplets of a second solvent substantially incapable of dissolving said resin over said wet resin coating so that said second solvent is taken into said wet resin coating to cause a portion of said resin to precipitate; and then drying said resin coating to form a porous support on said one surface of said film, so that said other surface of said film laminated on said support has the surface smoothness of at least 10,000 seconds.

* * * * *